US011558550B1

(12) United States Patent
Boxwell et al.

(10) Patent No.: US 11,558,550 B1
(45) Date of Patent: Jan. 17, 2023

(54) PRIVACY-PROTECTING MULTI-PASS STREET-VIEW PHOTO-STITCH (71) Applicant: International Business Machines Corporation, Armonk, NY (US)

(72) Inventors: Stephen Arthur Boxwell, Worthington, OH (US); Kyle Matthew Brake, Westerville, OH (US); Keith Gregory Frost, Delaware, OH (US); Stanley John Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/359,813

(22) Filed: Jun. 28, 2021

(51) Int. Cl.
*H04N 5/232* (2006.01)
*H04N 5/265* (2006.01)

(52) U.S. Cl.
CPC ..... *H04N 5/23238* (2013.01); *H04N 5/23218* (2018.08); *H04N 5/265* (2013.01)

(58) Field of Classification Search
None
See application file for complete search history.

(56) References Cited

U.S. PATENT DOCUMENTS

| 5,195,135 | A | 3/1993 | Palmer |
| 6,421,463 | B1 * | 7/2002 | Poggio ................. G06V 10/431 382/224 |
| 8,615,111 | B2 | 12/2013 | Garten |
| 9,204,198 | B2 | 12/2015 | Kutaragi |
| 9,342,998 | B2 | 5/2016 | Barnett |
| 9,986,290 | B2 | 5/2018 | Ayers |
| 10,284,789 | B2 | 5/2019 | Banik |
| 10,863,111 | B2 | 12/2020 | Gao |
| 2007/0053557 | A1 | 3/2007 | Cahill |
| 2011/0103644 | A1 | 5/2011 | Garten |
| 2012/0124461 | A1 | 5/2012 | Barnett |

(Continued)

FOREIGN PATENT DOCUMENTS

| CN | 108319888 A | 7/2018 |
| CN | 108959619 A | 12/2018 |

(Continued)

OTHER PUBLICATIONS

Mell et al., "The NIST Definition of Cloud Computing", National Institute of Standards and Technology, U.S. Department of Commerce, NIST Special Publication 800-145, Sep. 2011, 7 pages.

(Continued)

*Primary Examiner* — Shadan E Haghani
(74) *Attorney, Agent, or Firm* — Stephen R. Yoder (57) ABSTRACT

Generating a controllable panoramic image while eliminating unsuitable dynamic elements by receiving a plurality of images of a location from a user device, wherein the plurality of images includes images of a location at various times, identifying an object of one or more images of the plurality of images, wherein the object corresponds to an unsuitable condition for a database, determining a score of the one or more images of the plurality of images based at least in part on the identified object, determining a base image from the one or more images of the plurality of images, and generating a set of replacement images of the location based at least in part on respective determined scores of the one or more images of the plurality of images.

17 Claims, 4 Drawing Sheets

(56) References Cited

U.S. PATENT DOCUMENTS

| 2017/0857701 | | 3/2017 | Xiaohui |
| 2017/0270674 | A1* | 9/2017 | Shrivastava ............ G06T 7/194 |
| 2018/0012371 | A1* | 1/2018 | Klingner ................... G06T 7/50 |
| 2018/0173230 | A1* | 6/2018 | Goldman-Shenhar ....................... B60W 50/14 |
| 2018/0184062 | A1* | 6/2018 | Hariri ....................... G06T 7/90 |
| 2019/0089910 | A1 | 3/2019 | Banik |
| 2019/0289224 | A1 | 9/2019 | Gao |
| 2020/0265623 | A1* | 8/2020 | Gupta ..................... G06T 11/60 |

FOREIGN PATENT DOCUMENTS

| CN | 109062988 B | 10/2019 |
| CN | 111163332 A | 5/2020 |
| JP | 2013542505 A | 11/2013 |
| WO | 2012041903 A1 | 4/2012 |

OTHER PUBLICATIONS

Uchiyama et al., "Removal of Moving Objects from a Street-view Image by Fusing Multiple Image Sequences", Conf. Ttl: 2010 20th International Conference on Pattern Recognition (ICPR 2010), 2010, 4 pps., Publisher: IEEE Computer Society, Country of Publication: USA, ISBN: 9780769541099, Database: INSPEC(R).

"Patent Cooperation Treaty PCT Notification of Transmittal of the International Search Report and the Written Opinion of the International Searching Authority, or the Declaration", Applicant's file reference PF220467PCT, International application No. PCT/CN2022/101081, International filing date Jun. 24, 2022, dated Sep. 21, 2022, 10 pages.

* cited by examiner

PRIVACY-PROTECTING MULTI-PASS STREET-VIEW PHOTO-STITCH

BACKGROUND

The disclosure relates generally to image recognition. The disclosure relates particularly to combining data from multiple passes of user device to generate a controllable panoramic image while eliminating unsuitable dynamic elements.

Virtual reality (VR) is a simulated experience that can be similar to or completely different from the real world. Applications of virtual reality include entertainment (e.g., video games), education (e.g., medical or military training), and business (e.g., virtual meetings). Other distinct types of VR-style technology include augmented reality and mixed reality, sometimes referred to as extended reality or XR. A 360-degree photo is a controllable panoramic image that surrounds the original point from which the shot was taken. 360-degree photos simulate being in the shoes of a photographer and looking around to the left, right, up and down as desired as well as sometimes zooming.

Computer vision is an interdisciplinary scientific field that deals with how computers can gain high-level understanding from digital images or videos. From the perspective of engineering, computer vision seeks to understand and automate tasks that the human visual system is capable of performing. Computer vision tasks include methods for acquiring, processing, analyzing, and understanding digital images, and extraction of high-dimensional data from the real world. Sub-domains of computer vision include scene reconstruction, object detection, event detection, video tracking, object recognition, 3D pose estimation, learning, indexing, motion estimation, 3D scene modeling, and image restoration.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable combining data from multiple passes of a user device to generate a controllable panoramic image while eliminating unsuitable dynamic elements.

Aspects of the invention disclose methods, systems and computer readable media associated with receiving a plurality of images of a location from a user device, wherein the plurality of images includes images of a location at various times, identifying an object of one or more images of the plurality of images, wherein the object corresponds to an unsuitable condition for a database, determining a score of the one or more images of the plurality of images based at least in part on the identified object, determining a base image from the one or more images of the plurality of images, and generating a set of replacement images of the location based at least in part on respective determined scores of the one or more images of the plurality of images.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

A variety of internet services now allow users to view images of homes and businesses from street level. Generally taken by three-hundred and sixty (360) degree cameras mounted on imaging vehicles, these images are useful for various tasks. Embodiments of the present invention recognize that these images have the potential to unduly invade the privacy of individuals who happen to be present when the imaging vehicle passes. Conventional methods make efforts to obscure the faces of individuals and the license plates of cars. However, embodiments of the present invention recognize that challenges exist in preventing identification of individuals by methods of obscuring faces and license plates as individuals and property may be identified by other means. Additional embodiments recognize that certain objects are unsuitable for a database of a user for various reasons. For example, an individual or vehicle in an image may obscure an intended target (e.g., a storefront) of the image. In another example, an image is captured at a moment a trash can is overflowing on a sidewalk and this unpleasant image may unduly prejudice visitors against a location or business establishment. Also, an image is captured that includes a billboard advertisement with protected content (i.e., trademarks, copyrighted content, etc.) that is unsuitable for a database due to internal policies related to intellectual property of others.

Disclosed embodiments of the present invention enable combining data from multiple passes of a user device to generate a controllable panoramic image while eliminating unsuitable dynamic elements (e.g., objects corresponding to unsuitable conditions) from a database. Additionally, the disclosed embodiments of the present invention utilize temporal differences of a plurality of images of a location to eliminate the unsuitable dynamic elements. Furthermore, the disclosed embodiments automatically reducing memory utilization of the database by removing images that include the unsuitable dynamic elements.

In an embodiment, one or more components of the system can employ hardware and/or software to solve problems that are highly technical in nature (e.g., policy violation searches, identifying an object of one or more images of the plurality of images, wherein the object corresponds to an unsuitable condition for a database, etc.). These solutions are not abstract and cannot be performed as a set of mental acts by a human due to the processing capabilities needed to facilitate removing the base image that includes the object corresponding to the unsuitable condition from the database, for example. Further, some of the processes performed may be performed by a specialized computer for carrying out defined tasks related to mapping the set of weighted labels to the set of replacement images, wherein a weighted label corresponds to the object of a segment of the one or more images of the plurality of images. For example, a specialized computer can be employed to carry out tasks related to identifying an object of one or more images of the plurality of images, wherein the object corresponds to an unsuitable condition for a database or the like.

Implementation of embodiments of the invention may take a variety of forms, and exemplary implementation details are discussed subsequently with reference to the Figures.

In an embodiment, a system executing an unsuitable dynamic elements elimination method maps a set of weighted labels 'L' to one or more sets of replacement images. The method generates the set of weighted labels by assigning values (e.g., from 0.0 to 1.0, where 0.0 is the lowest value and 1.0 is the highest value) to a label 'l' that indicates how undesirable an object of an image is to a user (i.e., assigning values that indicate unsuitableness of an object of an image for an intended purpose of a database). The label corresponds to an unsuitable condition of the user for a database. For example, the unsuitable condition can relate to objects that cause issues including, but not limited to, conflicts of interests, invasions of privacy, offensive content, etc. Conflicts of interests may include use of images that include intellectual property of another or that violate compliance with an internal policy. Invasions of privacy may include images that disclose personally identifiable information (PII) of an individual or other data elements which identify a unique individual and can permit another person to "assume" that individual's identity without their knowledge or consent. Offensive content may include use of images that include violent, threatening, defrauding or obscene material.

In the embodiment, the method maps the labels to the one or more sets of replacement images. For example, the method can utilize a map function, which returns a map object (e.g., an iterator) of the results after applying the given function (e.g., a function to which the map function passes each element of a given iterable) to each item of a given iterable (e.g., list, tuple, etc.). In this example, the method utilizes 'map C (l, r)' where 'C' is an object that includes a returned list of results after applying the given function 'l', where 'l' represents a weighted label, and where 'r' represents the iterable (e.g., a replacement image of a set of replacement images) for mapping. Additionally, the method can utilize the 'C' to create lists and/or sets, which the method may organize by type (e.g., segments of images, objects, pixel ranges, etc.).

In an embodiment, the method receives a plurality of images of a geolocation from a user device. The method receives a plurality of images of a geolocation from an imaging device of a user via Transmission Control Protocol (TCP) and the Internet Protocol (IP). The images may be panoramic street-level images of a building taken at various times during multiple passes of the building. In this embodiment, the method utilizes the plurality of images to generate a set of replacement images. Additionally, the image and location data are provided by the imaging device and used for the disclosed method with the consent of the user. In an alternative embodiment, the method retrieves a plurality of images of a geolocation from a remote storage device. The method receives a notification that includes a storage location from an imaging device that the images are available for retrieval from a remote storage device. In this alternative embodiment, the method utilizes the storage location of the notification to retrieve the images from the remote storage device.

The method trains a machine learning model such as a recurrent neural network (RNN), support vector machine (SVM), or other classification machine learning model architecture, to identify objects corresponding to unsuitable conditions for an intended purpose of a database (i.e., identifying undesirable dynamic elements). The method trains the model to identify objects associated with weighted labels that correspond to unsuitable conditions. In an embodiment, the method labels a set of images that include features corresponding to objects of a class corresponding to unsuitable conditions and provides the labelled set of images for training the machine learning model. In an embodiment, the method reserves a portion of the labelled set of image data for use as test data to validate the trained machine learning model. The trained machine learning model enables the detection of objects corresponding to unsuitable conditions using new unlabeled image data of an imaging device of the user. The trained model provides an output that indicates detection and classification of one or more objects corresponding to unsuitable conditions by the trained model from the new input image data. The classification of one or more objects corresponding to unsuitable conditions is determined by the method according to the trained model's output.

In an embodiment, the method inputs one or more images (e.g., (p) is an image of a plurality of images) of a plurality of images (e.g., a set of images 'P') of the imaging device of the user into the trained model and determines whether one or more images of the plurality of images includes an object corresponding to unsuitable conditions (e.g., labels, class, etc.). In the embodiment, the method assigns a label to a segment (e.g., defined area) of an image that includes an object corresponding to an unsuitable condition.

In an embodiment, the method determines a score for an image (p) of a plurality of images of an imaging device of a user. The method assigns a score to the image utilizing a count of members of a set of labels 'L' corresponding to identified objects in the image and a respective weight of the members. For example, the method determines a score by utilizing $\Sigma(L(i))$, where 'i' is the label 'l' of each identified object on the image. In this example, the method can utilize the above methodology to determine a score associated with a segment (e.g., a sub-image, defined area, pixel range, etc.) of the image. Also, the method can determine a score for each image (p) of a set of images 'P' of received from an imaging device of a user.

In an embodiment, the method determines a base image (p') of a plurality of images of an imaging device of a user. The method identifies an image with the lowest value with respect to a determined score of each image of the plurality of images. In the embodiment, the method selects the image of the plurality of images with the lowest determined score and designates the image as the base image. Alternatively, the method can select the first image received from the imaging device of the user as the base image. In another embodiment, the method selects a user selected image provided by a device of a user as the base image.

In an embodiment, the method generates a set of replacement images for a base image. As images are received by the method from an imaging device of a user, the method determines a score for each of the received images using the methodology discussed above. In the embodiment, the method compares a determined score of the base image to a determined score of a received image to determine whether the determined score of the received image is lower than or equal to the determined score of the base image. In one scenario, if the method determines that the determined score of the received image is lower than or equal to the determined score of the base image, then the method adds the received image to a replacement set for the base image. In another scenario, if the method determines that the determined score of the received image is greater than the determined score of the base image, then the method does not add the received image to a replacement set for the base image. Alternatively, the method can discard the received image from a database due to unsuitability for use.

In another embodiment, the method generates a set of replacement sub-images for segments of a base image. The method generates a set of pairs 'M' that includes sub-images to score pairs for a labeled segment of the base image (p') and for each received image (p) of the plurality of images (e.g., set of images 'P'). In the embodiment, the method utilizes a set of expressions to populate 'M', which may be utilized to replace the labeled segment of the base image (p') with a sub-image of the image (p). For example, if the method determines that (p'=p), then the method adds a labeled segment of the base image (p') to 'M' with a score corresponding to the labeled segment. In the event the method determines "p'≠p" (e.g., first expression), then the method evaluates a second expression of a set of expressions. In this example, if the method determines a sub-image of the image (p) is unlabeled and corresponds to the labeled segment of the base image (p'), then the method adds the sub-image of the image (p) to 'M' with a score of zero (0.0). In the event the method determines the second expression evaluates to false, then the method evaluates a third expression of the set of expressions. In this example, if the method determines a sum of the labels (e.g., sub-image score) of the sub-image of the image (p) corresponds to the labeled segment of the base image (p') and the sum of the labels of (p) is less than a score (e.g., segment score) of the labeled segment of the base image (p'), then the method adds the sub-image of the image (p) to 'M' with the sum of the labels of the sub-image as a score.

In an embodiment, the method replaces a base image with a replacement image of a generated set of replacement images. The method identifies an image of the generated set of replacement images with a score that is lower than a score of the base image. In the embodiment, if the method does not identify an image of the generated set of replacement images with a score lower than the base image, then the method masks an object of the base image corresponding to an unsuitable condition. For example, the method adds an overlay layer to a base image that includes an object corresponding to an unsuitable condition. In this example, the overlay layer includes an image that covers the object and blocks the object from view of viewers.

In another embodiment, the method replaces a segment of a base image with a sub-image of a set of replacement sub-images. The method can rank sub-images of a set of replacement sub-images by scores (e.g., cumulative score of objects) to identify a sub-image of the set of replacement sub-images with the lowest score corresponding to a segment of a base image. In the embodiment, the method can replace the segment of the base image with the identified sub-image if the score of the sub-image is less than the score of labels of the segment of the base image. In one scenario, if the method determines expressions of a set of expressions evaluate to false, the method replaces a labeled segment of the base image (p') with a corresponding sub-image of 'M' with the lowest score that is less than a score of the labeled segment. In another scenario, if the method determines a sub-image of 'M' with the lowest score that corresponds to a labeled segment of the base image (p') is not less than a score of the labeled segment, then the method masks the segment of the base image (p'). For example, masking can include, but is not limited to, mosaicking an image and covering a segment of the base image, adding an image to a layer that covers the segment, etc.

In yet another embodiment, the method utilizes a label of a segment of a base image and a generated set of weighted labels to replace the segment of the base image. The method determines that one or more labeled segments are a key in the generated set of weighted labels. In the embodiment, the method replaces a label of the one or more labeled segments identified as a key with a replacement sub-image 'r' of a set of replacement images (i.e., if a labeled segment of the base image (p') is a key of 'C', then replace the labeled segment of the base image (p') with the replacement 'r').

In an embodiment, the method returns a base image that includes a replacement image. The method provides a new or modified base image that either no longer includes an object corresponding to an unsuitable condition for a database or the object of the modified base image is masked. In the embodiment, the method can remove the replaced base image or labeled segment of the base image from the database, which brings the database into compliance with a policy of the user and/or increases available memory resources of the database for additional suitable replacement images. Additionally, the method provides the suitable base image for generation of panoramic street-level images that protect the privacy of pedestrians and prevent infringement of property rights.

Figure 1:
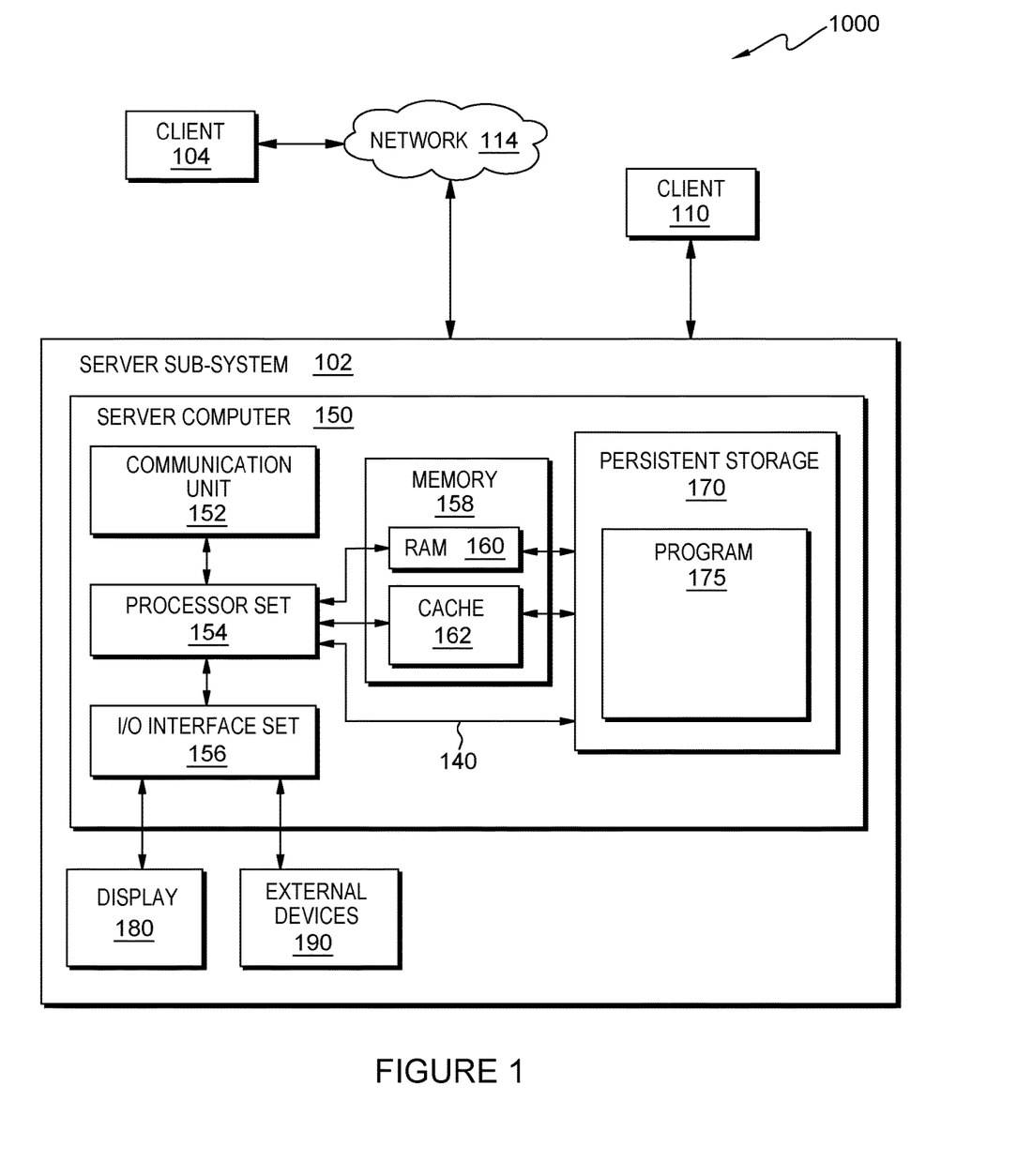
FIG. 1 provides a schematic illustration of a computing environment, according to an embodiment of the invention.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise application program (not shown) together with sufficient computing resource (processor, memory, network communications hardware) to execute the program.

As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment may be made by those skilled in the art without departing from the scope of the invention as recited by the claims.

The present invention may contain various accessible data sources, such as client devices 104 and 110 and memory 158, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 175 enables the authorized and secure processing of personal data. Program 175 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Program 175 provides information regarding personal data and the nature (e.g., type, scope, purpose, duration, etc.) of the processing. Program 175 provides the user with copies of stored personal data. Program 175 allows the correction or completion of incorrect or incomplete personal data. Program 175 allows the immediate deletion of personal data.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
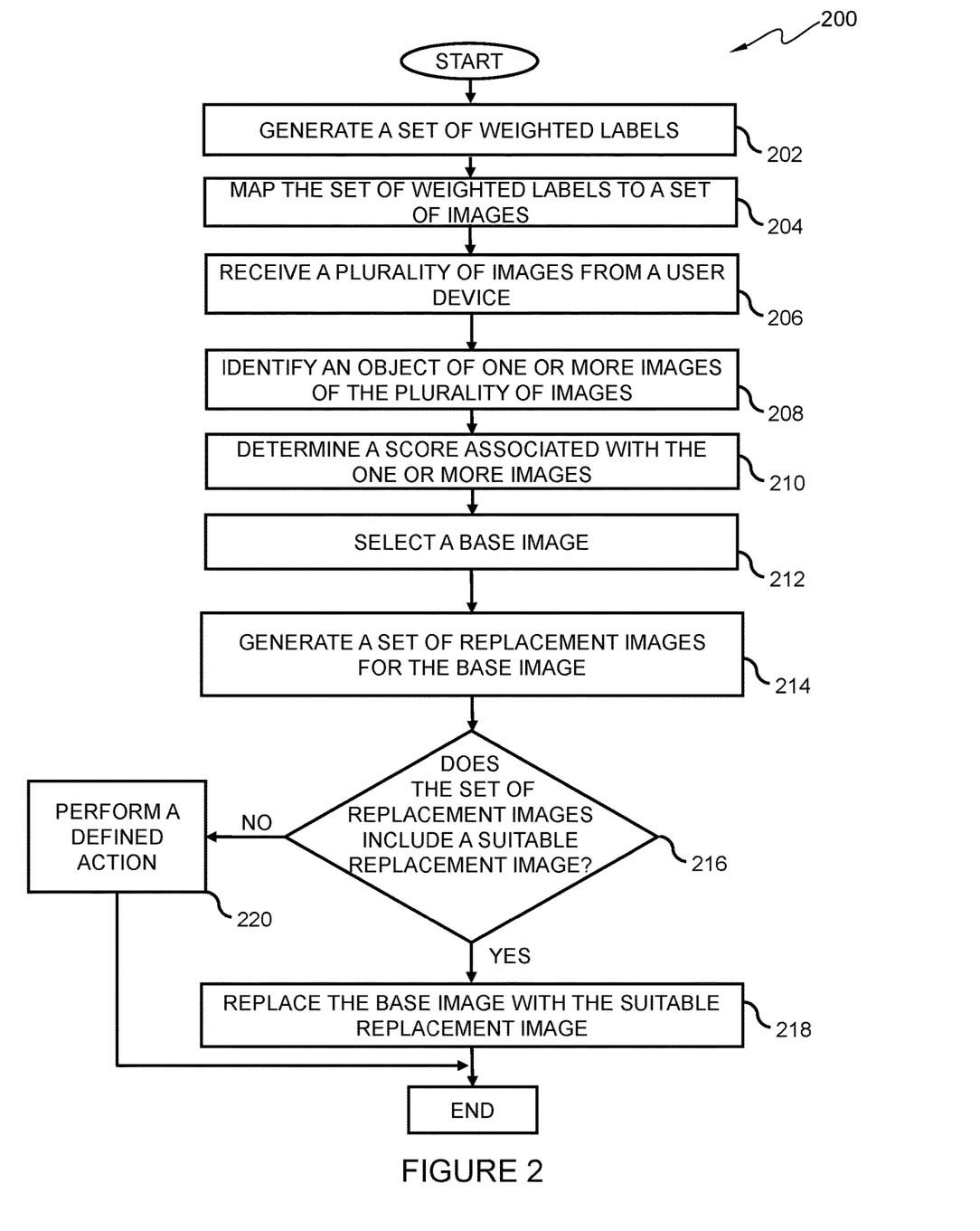
FIG. 2 provides a flowchart depicting an operational sequence, according to an embodiment of the invention.

FIG. 2 provides a flowchart 200, illustrating exemplary activities associated with the practice of the disclosure. In one embodiment, program 175 initiates in response to a user connecting client devices 104 or 110 to program 175 through network 114. For example, program 175 initiates in response to a user registering (e.g., opting-in) an imaging device (e.g., client device 104) with program 175 via a WLAN (e.g., network 114). In another embodiment, program 175 is a background application that continuously monitors client device 104. For example, program 175 is a client-side application that initiates upon booting of an imaging device (e.g., client device 104) of a user and monitors for image data of the imaging device.

After program start, at block 202, the method of program 175 generates a set of weighted labels. In an embodiment, program 175 generates a set of weighted labels and stores the set of weighted labels in memory 158 of server computer 150.

At block 204, the method of program 175 maps the set of weighted labels to a set of images. In an embodiment, program 175 maps a set of weighted labels in memory 158 of server computer 150 to a set of images of memory 158. In this embodiment, the set of images of memory 158 may initially not include any images, and program 175 maps the weighted label to target destinations of values for the set of images for a database object of memory 158 as received from client device 104.

At block 206, the method of program 175 receives a plurality of images from a user device. In an embodiment, program 175 receives a plurality of images of a location from client device 104 of a user. In this embodiment, program 175 stores the plurality of images in memory 158. Additionally, program 175 updates the plurality of images from client device 104 as program 175 receives additional images. In another embodiment, program 175 retrieves a plurality of images of a location from client device 104. In this example, program 175 transmits a request for the plurality of images to be transmitted to server computer 150 via network 114.

At block 208, the method of program 175 identifies an object of one or more images of the plurality of images. In an embodiment, program 175 utilizes a set of weighted labels of memory 158 to identify an object corresponding to a label of the set of labels in an image of a plurality of images received from client device 104. In this embodiment, program 175 utilizes computer-vision techniques (e.g., machine learning model) to detect the object in the image that corresponds to the label.

At block 210, the method of program 175 determines a score associated with the one or more images. In an embodiment, program 175 utilizes weights associated with each label of the set of weighted labels to determine a score for one or more images of the plurality of images of memory 158 received from client device 104. In this embodiment, program 175 determines a score for one or more sub-images of the one or more images of the plurality of images.

At block 212, the method of program 175 selects a base image. In an embodiment, program 175 determines a base image utilizing one or more images of a plurality of images of memory 158 received from client device 104. In this embodiment, program 175 identifies an image of the plurality of images of memory 158 with the lowest determined score and selects the image as the base image. In another embodiment, program 175 receives an image from client device 104 of a user. In this embodiment, the user indicates to program 175 that the image is a base image for initial use.

At block 214, the method of program 175 generates a set of replacement images for the base image. In an embodiment, program 175 utilizes a score of a base image and a score of one or more images of a plurality of images of memory 158 received from client device 104 to generate a set of replacement images in memory 158 for the base image. In this embodiment, program 175 compares scores of the base image and the one or more images of the plurality of images and determines whether an image of the plurality of images can be included in the set of replacement images. Additionally, the set of replacement images can include a set of replacement sub-images based on scores of segments of the plurality of images.

At block 216, the method of program 175 determines whether the set of replacement images includes a suitable replacement image. In an embodiment, program 175 queries a set of replacement images in memory 158 to identify a replacement image for a base image. In this embodiment, program 175 compares a score of the base image to scores of images of the set of replacement images to identify the replacement image. Also, program 175 can compare a score of a segment of the base image to scores of sub-images of a set of replacement sub-images to identify a replacement sub-image. Program 175 may identify replacements (e.g., sub-image, images) utilizing the lowest score or identifying a label of the base image as a key in a returned object of a database based at least in part on a mapped set of weighted labels.

At block 218, the method of program 175 performs a defined action. In an embodiment, program 175 performs a defined task. In this embodiment, if program 175 determines that a base image is replaced with a replacement image of a set of replacement images of memory 158, then program 175 removes the base image from memory 158. Additionally, program 175 can remove a segment of a base image from memory 158 that program 175 replaces with a replacement sub-image. In another embodiment, if program 175 determines that a set of replacement images of memory 158 does not include a suitable replacement image for a base image, then program 175 masks an object corresponding to an unsuitable condition of the base image. Additionally, program 175 can mask a segment of the base image so that the object corresponding to an unsuitable condition of the base image is not in view of a user.

At block 220, the method of program 175 replaces the base image with the suitable replacement image. In an embodiment, program 175 replaces a base image with a replacement image of a set of replacement images in memory 158. In this embodiment, program 175 replaces the base image with a returned replacement image that is determined to have a score less than the base image. In another embodiment, program 175 replaces a segment of a base image with a replacement sub-image that corresponds to the segment and that is determined to have a score less than the segment of the base image. In this embodiment, program 175 returns the base image that includes the replacement sub-image instead of with the segment of the base image.

In an example embodiment, a user intends to capture image data with client device 104 for a database of street-level images. The user intends to generate high-quality images of storefronts and homes and intends to avoid the following objects in the images. Program 175 assigns weights provided by the user to the objects, which in indicate how unsuitable the objects are: Pedestrians (0.5); Cyclists (0.5); Buses (0.7); and Overflowing garbage cans (0.9) (e.g., set of weighted labels). In this example embodiment, program 175 maps the set of weighted labels to captured image data as images are captured by client device 104 (i.e., initially map C is empty). The user makes three (3) passes down Main Street on three (3) different days and captures three (3) images of a storefront at a geolocation with client device 104. In the first image, the storefront has one pedestrian on the left side of the image. In the second image, the storefront has an overflowing garbage can on the right. In the third image, the entire image of the storefront is obscured by a bus. Program 175 performs computer-vision techniques on the three images and each image is assigned one (1) labeled segment (e.g., 'PEDESTRIAN', 'OVERFLOWING_GARBAGE_CAN', and 'BUS', respectively). Of the three images, program 175 selects the first image (i.e., the one with the pedestrian) as a base image (e.g., p'), because the first image has the lowest score based on the set of weighted labels.

Now, program 175 iterates through a plurality of images (e.g., set of images 'P') captured by client device 104. Program 175 determines the first image, which equals p', has an image of a pedestrian in the labeled segment of the first image (with a score of 0.5). Program 175 determines the second image has no object in a segment that corresponds to the labeled the segment of the base image and is assigned a score of (0.0). Program 175 determines the third image consists entirely of bus in a segment that corresponds to the labeled the segment of the base image and is assigned a score of 0.7. Program 175 determines that of the three (3) candidate replacements (including the base image as a "replacement") the second image has the lowest score and uses the segment that corresponds to the labeled the segment of the base image (i.e., sub-image) to replace the labeled the segment of the base image. Additionally, program 175 removes the segment and unsuitable condition of the base image from the database.

In another example embodiment, a user intends to capture image data with client device 104 for a database of street-level images. The user intends to generate high-quality images of storefronts and homes and intends to avoid objects in the images that correspond to content of a competitor of the user. In this example embodiment, program 175 masks the content of the competitors with another image in the event the content appears in an image of the database. Additionally, program 175 generates a set of labels of unsuitable content that includes protected content of Company One and protected content of Company Two. Program 175 returns [Company One→{Image1.jpg, Image2.jpg, Image3.jpg}, Company Two→{Image1.jpg, Image2.jpg, Image3.jpg}] in response to performing a map function (e.g., Map C). The user makes three (3) passes through the same area over the period of a week. Program 175 identifies protected content of Company one and Company Two in images of two (2) passes. In the third pass, program 175 determines that the protected content of Company Two has been replaced by content of Company Three, which is not a competitor of the user, and the content of Company Three not included in the label set 'L'. In this example embodiment, program 175 selects an image of the third pass, which contains only the protected content of Company One, as a base image (p'). Additionally, program 175 detects unsuitable content in each image and determines no suitable image exists to replace the segment of the base image that includes the unsuitable content. Thus, program 175 can mask or replace the segment of the base image that includes the unsuitable content with another image.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
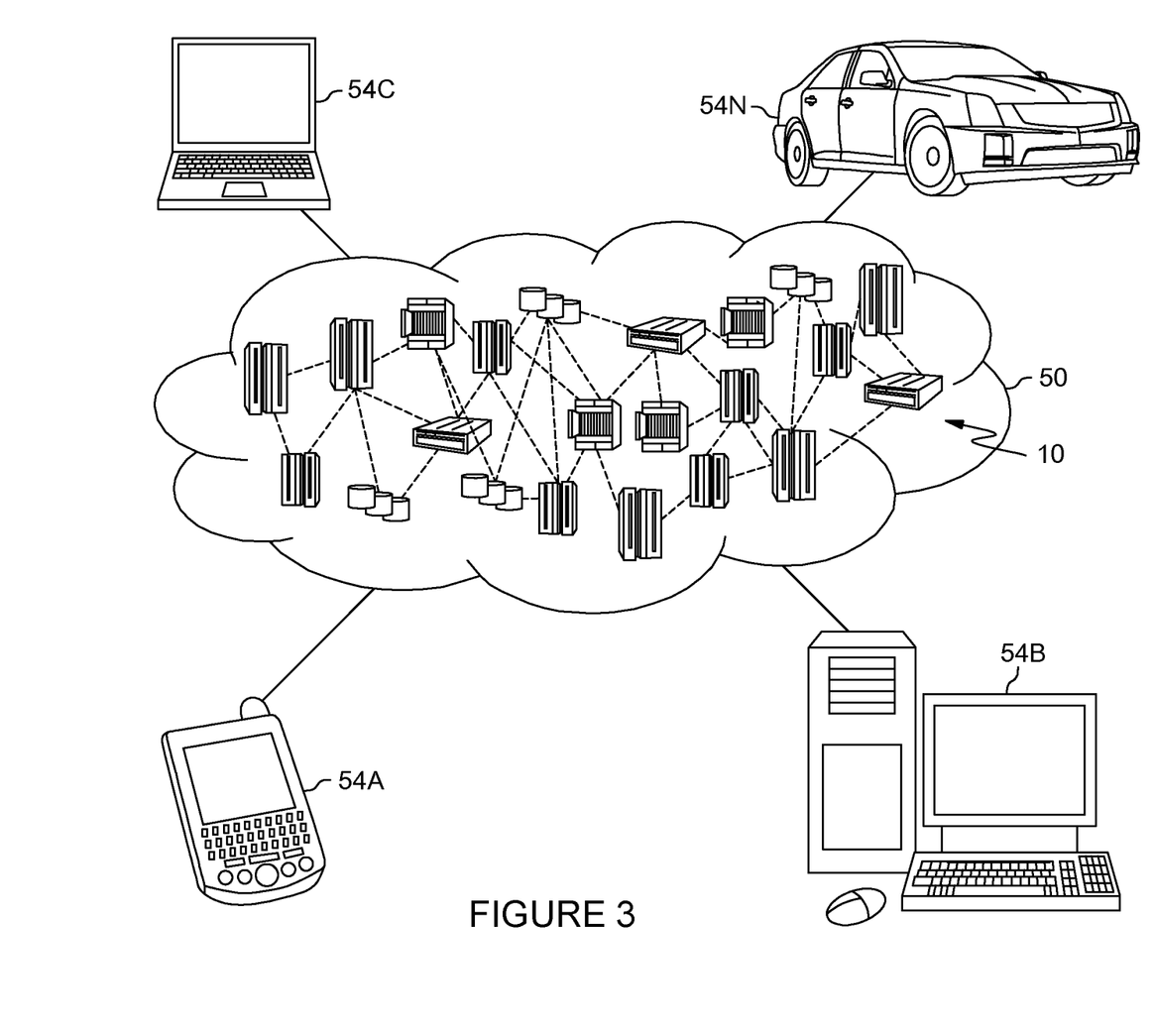
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
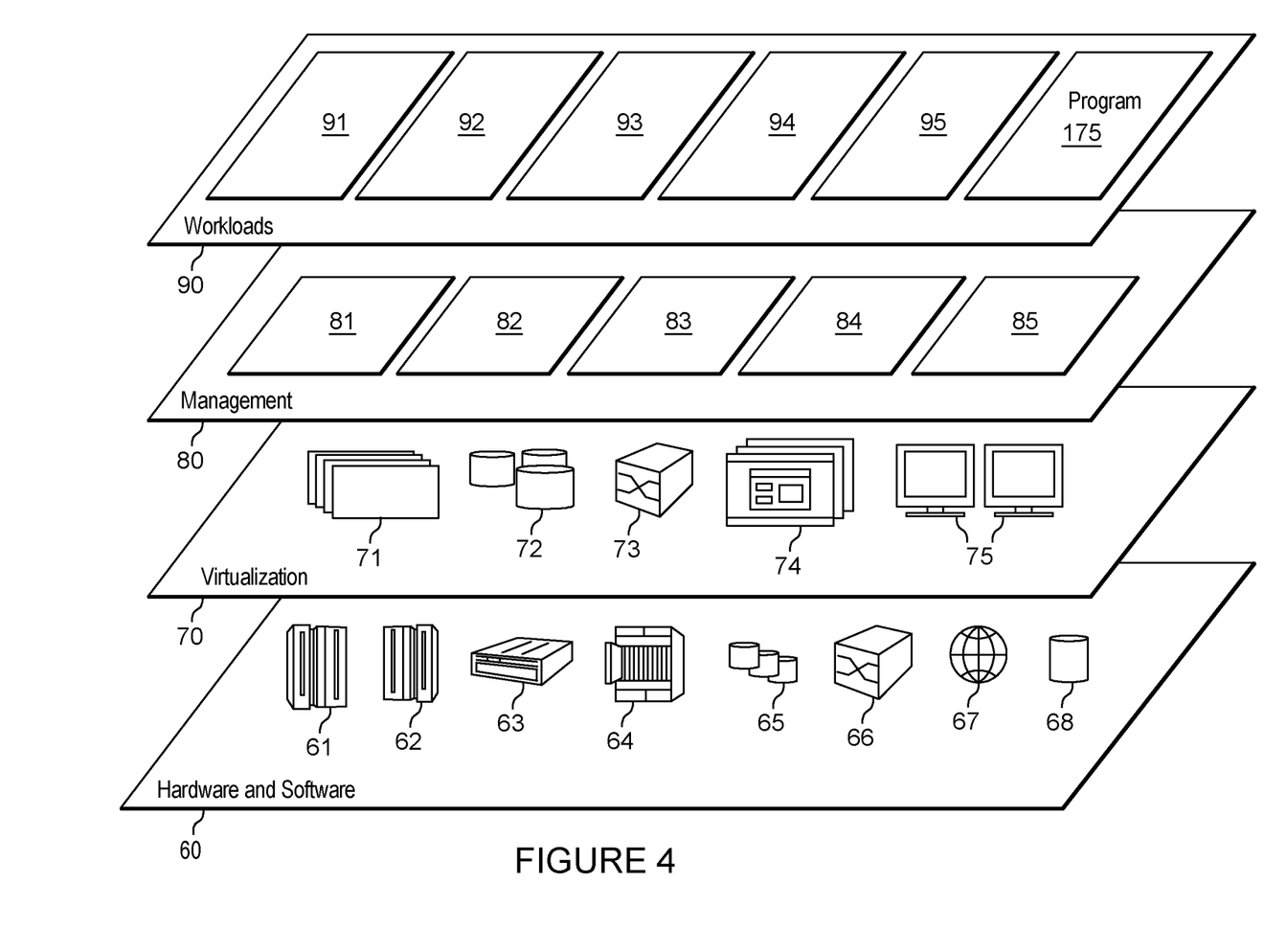
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
generating a set of weighted labels respectively corresponding to unsuitable conditions for a target database;
receiving, by the target database, a plurality of images of a location from a user device;
identifying an object of segments of a sub-set of images of the plurality of images, wherein the object corresponds to an unsuitable condition for a target database;
determining a suitability score of the sub-set of images based at least in part on the identified object, with the suitability score being a numerical value that indicates an extent to which segments of the sub-set of images can be used as a suitable replacement sub-image in the target database;
mapping the set of weighted labels to the sub-set of images, wherein a first weighted label corresponds to the identified object of the segments of the sub-set of images
generating a set of replacement sub-images based at least in part on weighted labels of respective segments of the sub-set of images, wherein the set of replacement sub-images correspond to the respective segments;
determining a base image from the sub-set of images, with the base image being an image having a lowest determined suitability score; and
determining a first segment of the set of replacement sub-images to use as a replacement segment for the identified object based on the corresponding suitability score.

2. The method of claim 1 further comprising:
identifying a replacement image of the set of replacement images associated with a first determined score less than a second determined score associated with the base image; and
replacing the base image with the replacement image of the set of replacement images.

3. The method of claim 2 further comprising:
replacing the base image with the replacement image of the set of replacement images; and
removing the base image that includes the object corresponding to the unsuitable condition from the database.

4. The method of claim 1, further comprising:
determining that no sub-image of the set of replacement sub-images associated with a first weighted label is less than a second weighted label's value associated with a segment of the base image; and
masking the segment of the base image.

5. The method of claim 1, further comprising:
identifying a sub-image of the set of replacement sub-images associated with a first weighted label's value less than a second weighted label's value associated with a segment of the base image; and replacing the segment of the base image with the sub-image of the set of replacement sub-images, wherein the segment of the base image includes unsuitable conditions.

6. The method of claim 5 further comprising:
replacing the segment of the base image with the sub-image of the set of replacement sub-images; and
removing the segment of the base image that includes the unsuitable conditions from the database.

7. A computer program product comprising:
a machine readable storage device; and
computer code stored on the machine readable storage device, with the computer code including instructions and data for causing a processor(s) set to perform operations including the following:
generating a set of weighted labels respectively corresponding to unsuitable conditions for a target database,
receiving, by the target database, a plurality of images of a location from a user device,
identifying an object of segments of a sub-set of images of the plurality of images, wherein the object corresponds to an unsuitable condition for a target database,
determining a suitability score of the sub-set of images based at least in part on the identified object, with the suitability score being a numerical value that indicates an extent to which the segments of the sub-set of images can be used as a suitable replacement sub-image in the target database,
mapping the set of weighted labels to the sub-set of images, wherein a first weighted label corresponds to the identified object of the segments of the sub-set of images,
generating a set of replacement sub-images based at least in part on weighted labels of respective segments of the sub-set of images, wherein the set of replacement sub-images correspond to the respective segments,
determining a base image from the sub-set of images, with the base image being an image having a lowest determined suitability score, and
determining a first segment of the set of replacement sub-images to use as a replacement segment for the identified object based on the corresponding suitability score.

8. The computer program product of claim 7 further comprising:
identifying a replacement image of the set of replacement images associated with a first determined score less than a second determined score associated with the base image; and
replacing the base image with the replacement image of the set of replacement images.

9. The computer program product of claim 8 further comprising:
replacing the base image with the replacement image; and
removing the base image that includes the object corresponding to the unsuitable condition from the database.

10. The computer program product of claim 7, further comprising:
determining that no sub-image of the set of replacement sub-images associated with a first weighted label is less than a second weighted label's value associated with a segment of the base image; and
masking the segment of the base image.

11. The computer program product of claim 7, further comprising:
identifying a sub-image of the set of replacement sub-images associated with a first weighted label value less than a second weighted label's value associated with a segment of the base image; and
replacing the segment of the base image with the sub-image of the set of replacement sub-images, wherein the segment of the base image includes unsuitable conditions.

12. The computer program product of claim 11 further comprising:
replacing the segment of the base image with the sub-image of the set of replacement sub-images; and
removing the segment of the base image that includes the unsuitable conditions from the database.

13. A computer system comprising:
a processor(s) set;
a machine readable storage device; and
computer code stored on the machine readable storage device, with the computer code including instructions and data for causing the processor(s) set to perform operations including the following:
generating a set of weighted labels respectively corresponding to unsuitable conditions for a target database,
receiving, by the target database, a plurality of images of a location from a user device,
identifying an object of segments of a sub-set of images of the plurality of images, wherein the object corresponds to an unsuitable condition for a target database,
determining a suitability score of the sub-set of images based at least in part on the identified object, with the suitability score being a numerical value that indicates an extent to which the segments of the sub-set of images can be used as a suitable replacement sub-image in the target database,
mapping the set of weighted labels to the sub-set of images, wherein a first weighted label corresponds to the identified object of the segments of the sub-set of images,
generating a set of replacement sub-images based at least in part on weighted labels of respective segments of the sub-set of images, wherein the set of replacement sub-images correspond to the respective segments,
determining a base image from the sub-set of images, with the base image being an image having a lowest determined suitability score, and
determining a first segment of the set of replacement sub-images to use as a replacement segment for the identified object based on the corresponding suitability score.

14. The computer system of claim 13 further comprising:
identifying a replacement image of the set of replacement images associated with a first determined score less than a second determined score associated with the base image; and
replacing the base image with the replacement image of the set of replacement images.

15. The computer system of claim 13 further comprising:
determining that no sub-image of the set of replacement sub-images associated with a first weighted label is less than a second weighted label's value associated with a segment of the base image; and
masking the segment of the base image.

16. The computer system of claim 13 further comprising:
identifying a sub-image of the set of replacement sub-images associated with a first weighted label's value less than a second weighted label's value associated with a segment of the base image; and replacing the segment of the base image with the sub-image of the set of replacement sub-images, wherein the segment of the base image includes unsuitable conditions.

17. The computer system of claim 16 further comprising:
replacing the segment of the base image with the sub-image of the set of replacement sub-images; and
removing the segment of the base image that includes the unsuitable conditions from the database.

\* \* \* \* \*